W. L. FERGUS.
GEAR SHIFTING MECHANISM FOR MOTOR VEHICLES.
APPLICATION FILED JUNE 27, 1919.
1,331,426.
Patented Feb. 17, 1920.
2 SHEETS—SHEET 2.
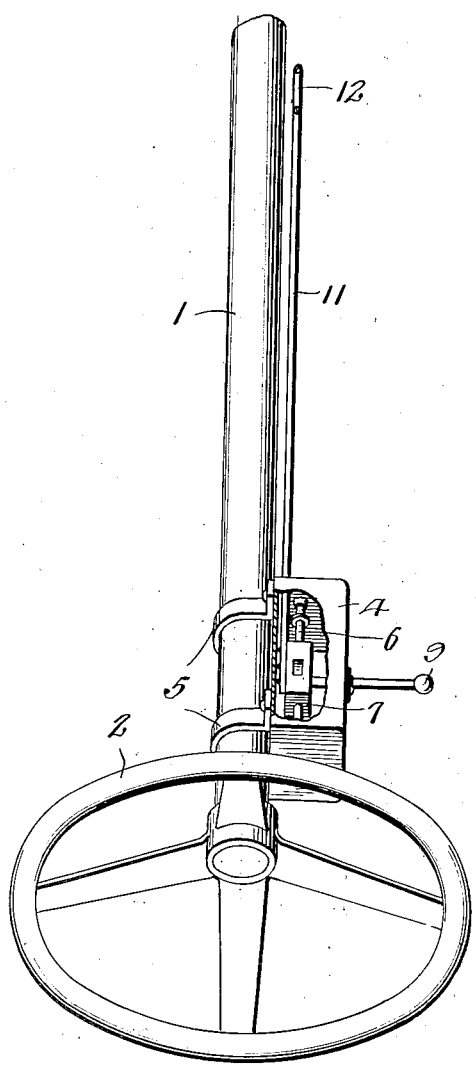
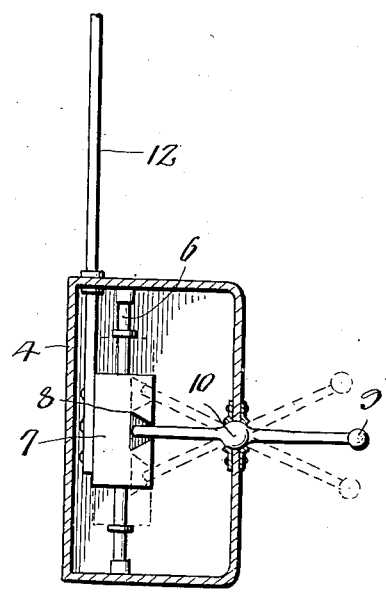
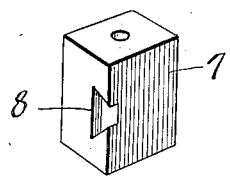
Witnesses
Inventor
W. L. Fergus,
By Victor J. Evans
Attorney

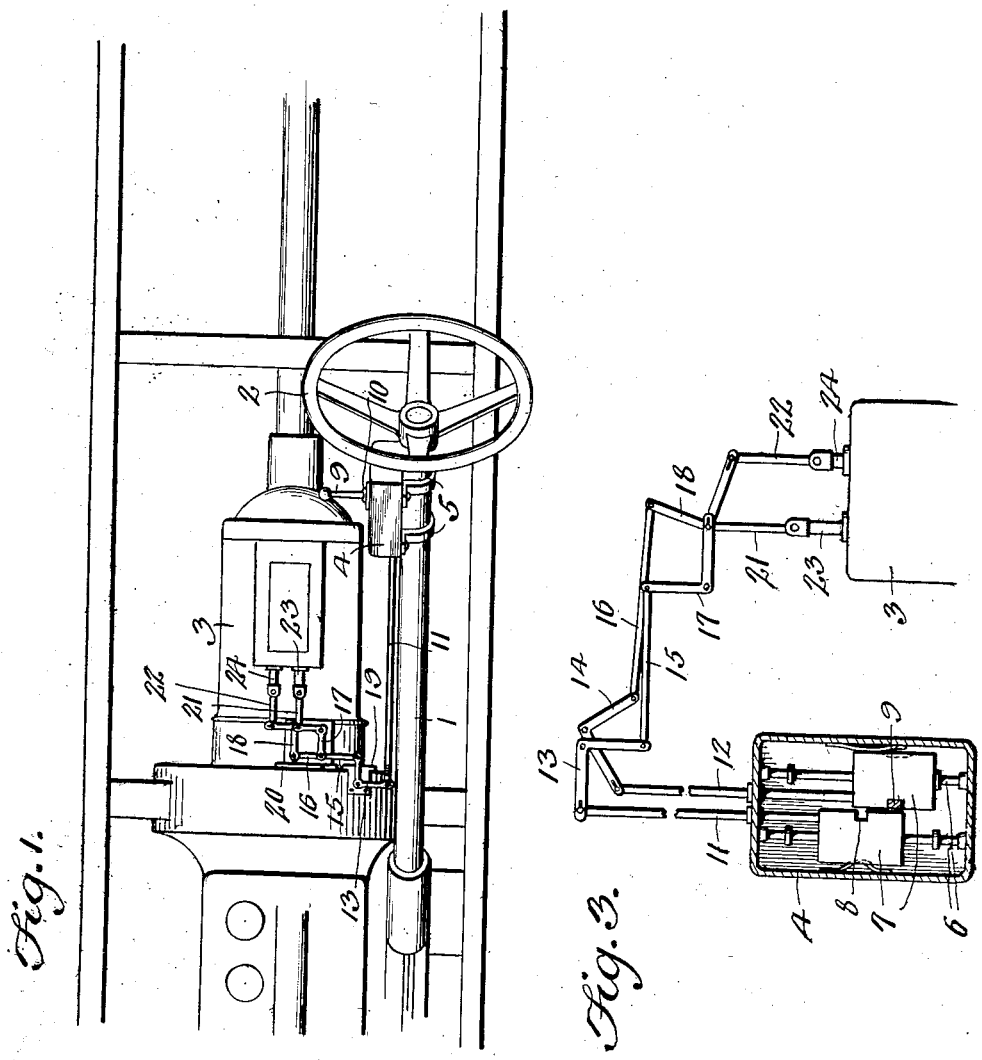

UNITED STATES PATENT OFFICE.

WALTER L. FERGUS, OF ST. JOHN, KANSAS.

GEAR-SHIFTING MECHANISM FOR MOTOR-VEHICLES.

1,331,426.  Specification of Letters Patent.  Patented Feb. 17, 1920.

Application filed June 27, 1919. Serial No. 307,258.

*To all whom it may concern:*

Be it known that I, WALTER L. FERGUS, a citizen of the United States, residing at St. John, in the county of Stafford and State of Kansas, have invented new and useful Improvements in Gear-Shifting Mechanism for Motor-Vehicles, of which the following is a specification.

This invention relates to gear shifting mechanism for motor vehicles, the main object of the invention being to provide mechanism of the class referred to in which the initial controlling or shifting element is arranged always within easy reach of the driver, obviating the necessity of the driver reaching forward and materially changing his position in order to manipulate the gear shifting lever at present in use. Another object in view is to provide gear shifting mechanism which will not interfere in the slightest with the use of a robe or other covering.

Another object of the invention is to provide mechanism of the character referred to which is adapted to any make of car, being capable of being applied to any car during the manufacture of the same or at any time subsequent thereto without material alteration of any part or parts of the mechanism.

With the above and other objects in view, the invention consists in the novel construction, combination and arrangement of parts, as herein described, illustrated and claimed, this application being identical with my application filed November 11, 1916, Serial No. 130,843, forfeited July 15, 1917.

In the accompanying drawings:—

Figure 1 is a plan view of a sufficient portion of a chassis of an automobile to illustrate the gear shifting mechanism of this invention in its applied relation thereto.

Fig. 2 is a plan view on an enlarged scale, partly in section, showing the gear shifting mechanism in its relation to the steering column.

Fig. 3 is a diagrammatic view illustrating the operation of the lever actuated members and the connections between said members and the shifting rods of the transmission gearing.

Fig. 4 is a longitudinal section through the housing of the initial elements of the gear shifting mechanism.

Fig. 5 is a detail perspective view of the runner.

Referring to the drawings 1 designates the steering column of a motor vehicle, 2 the hand wheel which, as is well understood by those familiar with the art to which this invention appertains, is on the upper end of the steering shaft (not shown) which extends through the steering column 1 which as is also well known is of tubular formation. 3 designates the casing of the transmission gearing, the same being shown merely in plan view as it contains the conventional form of transmission gearing of the selective sliding type.

In carrying out this invention, I employ a housing 4 also constituting a supporting frame which is fastened securely to the steering column 1 at any suitable distance below the hand wheel 2, the fastening means being shown for convenience in the form of collars 5 secured to the adjacent side of the housing 5 and extending around and being clamped securely upon the steering column 1.

The housing 4 has generally a rectangular shape as indicated in Fig. 3 and has extending from end to end thereof guides 6 shown in the form of rods which are parallel to each other and substantially parallel to the steering column 1. Upon each of the guides 6 is mounted a runner or slide 7 and when these slides are exactly opposite each other, the gear shifting mechanism is in a position known as "neutral". Each of the members 7 has a notch 8 formed in the inner face thereof and when the parts are in neutral position, the notches 8 lie directly opposite each other so as to receive the inner extremity of a gear shifting lever 9 as indicated in Fig. 1. The lever 9 is supported by a ball and socket joint 10 between the ends thereof as shown in the same figure and is adapted to be moved from a central or neutral position to the angular position indicated by dotted lines. Before shifting the lever 9 longitudinally of the housing 6, it is first shifted slightly in a lateral direction to cause the inner extremity of said lever to enter the notch 8 of one or the other of the runners or sliding members 7. This enables either of the runners 7 to be shifted forwardly or backwardly without disturbing the other member which remains at neutral.

Connected to one of the members 7 is a rod 11 and connected to the other member is a rod 12. These rods which are actuated by the members 7 are connected to elbow levers 13 and 14 and these are in turn connected by rods 15 and 16 to other elbow levers 17 and 18 respectively. The levers 13 and 14 are pivotally supported at their elbows upon a bracket 19 secured to any convenient stationary part of the machine. The levers 17 and 18 are likewise pivotally supported by an arm or bracket 20 attached to any stationary part of the machine. From the levers 17 and 18, rods 21 and 22 extend to and connect with the gear shifting rods 23 and 24, the end portions of which are shown as projecting from the casing 3 of the transmission gearing.

From the foregoing description, taken in connection with the accompanying drawings, it will now be understood that by shifting the lever 9 laterally, the inner end thereof may be brought into engagement with either one of the notches 8 and then by shifting the lever in the direction of length of the steering column, the respective member 7 is slid in either one direction or the other according to the speed desired. One of the members 7 usually controls the first speed and reverse, while the other member 7 controls the intermediate and high speed gears. In this way all three forward speeds and one reverse are obtained. By reason of the gear shifting lever 9 being located close to the wheel 2, it may be operated without the driver shifting his position and thereby adds greatly to the comfort and endurance of the driver, it being well understood that the frequent shifting of gears is the cause of much weariness to the driver where great distances are covered.

I claim:—

1. Gear shifting mechanism for motor vehicles, comprising in combination with the steering column and the gear shifting members of the transmission gearing, parallel guides supported in fixed and substantially parallel relation to said steering column, slidable members movable longitudinally of said guides in parallel planes and formed in their adjacent faces with notches which lie in opposition to each other when the transmission gears are in neutral, a hand lever pivotally supported between its ends on said housing and having one arm arranged to engage said notches and to be shifted from one notch to the other and to shift either sliding member independently of the other, and operating connections between said sliding members and the gear shifting members of the transmission gearing.

2. Gear shifting mechanism for motor vehicles, comprising in combination with the steering column and the gear shifting members of the transmission gearing, parallel guides supported in fixed and substantially parallel relation to said steering column, slidable members movable longitudinally of said guides in parallel planes and formed in their adjacent faces with notches which lie in opposition to each other when the transmission gears are in neutral, a hand lever pivotally supported between its ends on said housing and having one arm arranged to engage said notches and to be shifted from one notch to the other and to shift either sliding member independently of the other, operating connections between said sliding members and the gear shifting members of the transmission gearing, said connections comprising interconnected elbow levers, rods connecting one set of levers with said sliding members, and other rods connecting the other set of levers with said gear shifting members.

In testimony whereof I affix my signature.

WALTER L. FERGUS.